United States Patent

[11] 3,549,781

| [72] | Inventor | Les G. Jones<br>3460 West 7th St. Apt. 1012, Los Angeles, Calif. 90005 |
|---|---|---|
| [21] | Appl. No. | 759,084 |
| [22] | Filed | Sept. 11, 1968 |
| [45] | Patented | Dec. 22, 1970 |

[54] UNDER-FLOOR ELECTRICAL CONSTRUCTION FOR A BUILDING
4 Claims, 9 Drawing Figs.

| [52] | U.S. Cl. | 174/49, 52/221 |
|---|---|---|
| [51] | Int. Cl. | E04c 1/39 |
| [50] | Field of Search | 52/220, 221; 174/48, 49, 95, 96, 97, 98 |

[56] References Cited
UNITED STATES PATENTS
2,950,575  8/1960  Hellwig ......................... 52/221

FOREIGN PATENTS

| 909,131 | 10/1962 | Great Britain | 52/220 |
|---|---|---|---|
| 1,290,004 | 2/1962 | France | 52/220 |

*Primary Examiner*—Lewis H. Myers
*Assistant Examiner*—D. A. Tone
*Attorney*—Beehler & Arant ABSTRACT: Electrical floor ducts are provided for a building by laying parallel rows of rectangular blocks on a subfloor, with the blocks having channels formed in their undersides. Selected ones of the blocks have a cross-shaped channel formed in their undersides, so that a cable may be turned at a right angle under that particular block, or may be electrically connected to another cable which runs at a right angle to it. A reinforced concrete block construction is shown. The junction block is provided with a central access opening for pulling the cables. After the blocks are installed over the subfloor an electrical connection is made from any cable to a device located above the working floor surface, by cutting an access hole in a selected block, from its upper surface to the channel on its underside.

INVENTOR.

LES G. JONES

BY: BEEHLER & ARANT
ATTORNEYS 3,549,781

UNDER-FLOOR ELECTRICAL CONSTRUCTION FOR A BUILDING

BACKGROUND OF THE INVENTION

Under-floor electrical duct construction in buildings has conventionally involved the use of steel ducts that are laid on a reinforced concrete subfloor, after which another pouring of concrete is made to provide a thin layer that will cover up the duct work. Such construction is expensive and also limiting with respect to the permissible spacing and location of the floor ducts. Furthermore, it requires the workmen doing the construction work to follow precise drawings which may differ for each floor of each building.

The object and purpose of the present invention is to provide an under-floor electrical duct construction which will be considerably less expensive than the types of construction heretofore employed, but will provide at the same time additional advantages. One advantage of my invention is the greater flexibility in the location of the ducts and cable connections wherever desired on the floor area. Another advantage of my invention is the simplification of construction procedures, which may be completed by unskilled workmen following very simple directions.

DRAWINGS SUMMARIZED

PREFERRED EMBODIMENT

Figure 1:
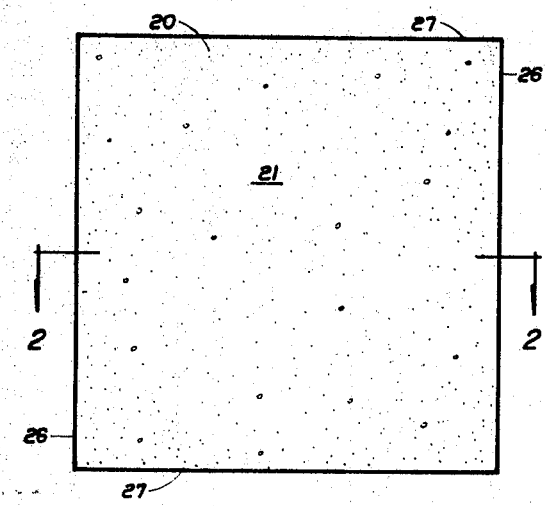
FIG. 1 is a top plan view of a channel block in accordance with my invention.
Figure 4:
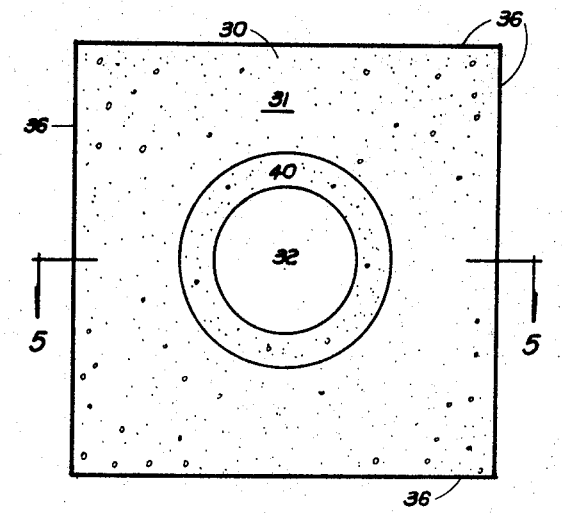
FIG. 4 is a top plan view of a junction block.

The channel blocks 20 and junction blocks 30 of my invention are of rectangular configuration, but preferably square so that rows of blocks and their underlying electrical cables may be more conveniently connected to each other at right angles. Preferably the blocks are 12 inches by 12 inches, since this dimension conforms well to the optimum thickness of the block, meets the maximum demands for availability of cable duct locations, and at the same time simplifies computations of the number of blocks that will be required for a given floor area, inasmuch as each block is 1-foot square.

The channel block 20 has a single channel 24 provided on its underside, which runs along one dimension of the block, which for purpose of reference is considered to be the length dimension. The junction block 30, however, provides two channels located at right angles to each other, hence the channel 34 of the junction block 30 is essentially of a cross-shaped configuration. The junction block may therefore be utilized for turning a single cable at a right angle from its initial direction, or it may serve as a point of electrical interconnection between two cables which cross each other at a right angle. The preferred thickness of the block is about 2½ inches, with the channel depth being about 1¼ inches, which is adequate to accommodate the thickness of present day electrical cables.

Figure 2:
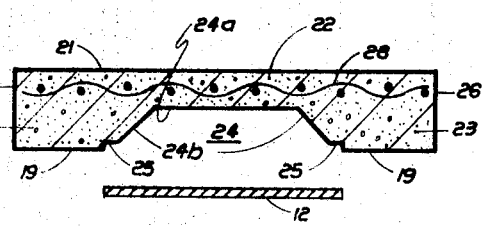
FIG. 2 is a vertical cross-sectional view of the channel block taken on line 2-2 of FIG. 1.

More specifically, as shown in the drawings, the channel block 20 has a flat upper surface 21 while its flat bottom surface is designated as 19. The average width of the channel 24 is about 6 inches, or approximately half the width of the block 20, but the channel 24 is narrow at the top and wide at the bottom, because of its sloping sidewalls 24b. Above the channel 24, as shown in FIG. 2, the base portion 22 of channel block 20 has a thickness of about 1¼ inches. A wire reinforcing mesh 28 is cast in the base portion 22 at approximately the vertical center thereof. On either side of the channel 24 the downwardly depending portions of the channel block form legs 23, and the outer walls of the legs are the vertical side edge surfaces 26 which are adapted to abut tightly against the sidewalls of the adjoining blocks. The end walls 27 of block 20 are also vertical and hence adapted to abut tightly against the end walls of other adjoining blocks.

Figure 8:
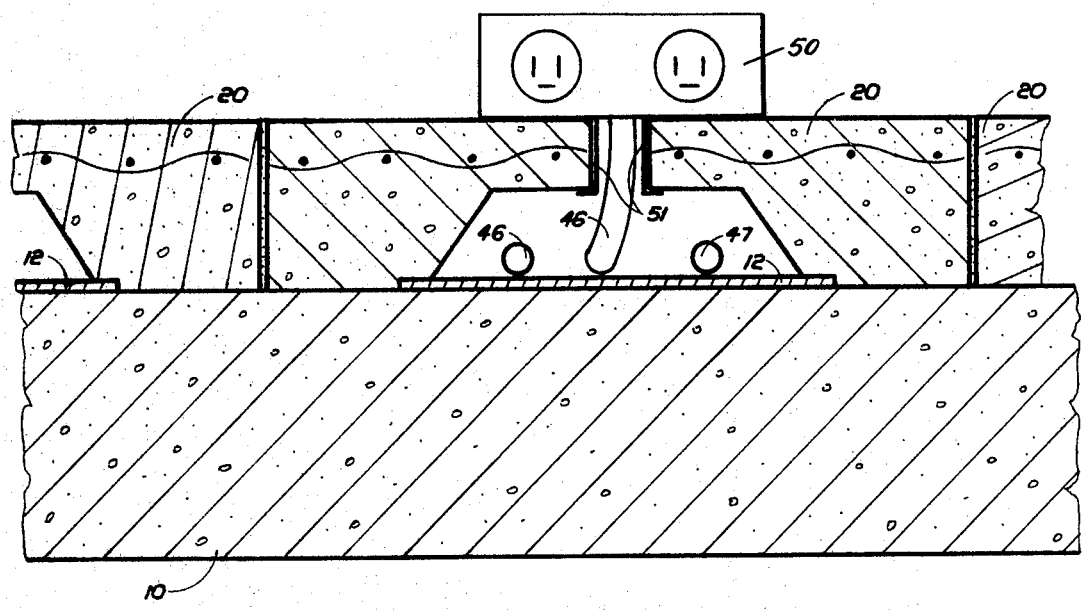
FIG. 8 is a fragmentary cross-sectional view of the floor structure showing a floor fitting located above the floor surface to which an electrical connection has been made.
Figure 9:
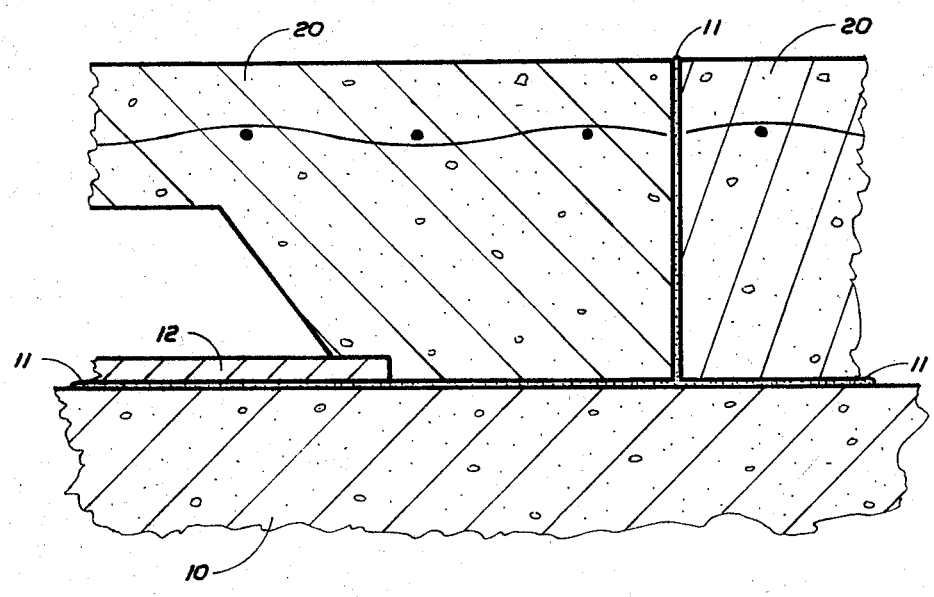
FIG. 9 is an enlarged detail view showing the adhesive securement of the blocks to the subfloor.

FIG. 8 shows in enlarged form the manner in which a channel block 20 is supported upon the subfloor 10, which is typically of reinforced concrete construction. The legs 23 of the block 20, at their bottom surfaces 19, are preferably secured to the subfloor by a layer of adhesive material 11, as specifically shown in FIG. 9.

Large buildings that require a versatile or complex under-floor duct system are almost universally constructed with reinforced concrete floors. Thus the channel blocks 20 in conjunction with the reinforced concrete subfloor 10 makes a complete enclosure for the electrical cables located within the channel 24. More particularly, the use of adhesive material 11 is effective to seal the interior of the channel 24 against moisture which might possibly enter in, thus providing a good and effective electrical enclosure. However, electrical construction, as well as other construction features, is now universally controlled by building ordinances and codes and the associated inspection procedures, and some inspection authorities do not accept the conclusion that the subfloor 10 may be considered as a satisfactory enclosure for the channel 24 of channel block 20. Accordingly, for the benefit of those jurisdictions, it is desirable to form channel ledges 25, which are adjacent to the sloping sidewalls 24b of channel 24, and adapted to receive a sheet metal bottom plate 12 which then encloses the channel 24 without protruding beneath the bottom surfaces 19 of the block. Plate 12 is shown in an open or expanded position in FIG. 2 and is shown in the closed or installed position in FIG. 8.

In junction block 30 the cross-shaped channel 34 leaves four identical legs 33 at the respective corners of the block. The outer edges of both the legs and the base portion of the block, shown at 36, are made vertical for abutting relationship to adjoining blocks. The vertical joints are, preferably, also sealed with adhesive material. Channel 34 has sloping sidewalls 34b similar to the sidewalls 24b, but each sidewall 34b has two portions at right angles to each other, connected by a curved portion of the sidewalls along the rounded inner corner of the associated legs 33. As with the channel block, in the junction block 30 the channel width is approximately half the width of the block, while the channel depth is approximately half the thickness of the block. The top surface of junction block 30 is identified as 31, and a reinforcing mesh 38 is disposed in the same position as corresponds to the mesh 28 of block 20.

The channel 34 of block 30 may, if desired, be closed on its undersurface by a cross-shaped bottom plate 13, the purpose of which corresponds to the plate 12. In order to receive the plate 13 there are recesses or ledges 35 provided at the juncture of each channel wall 34b with the bottom surface of the corresponding leg 33.

Figure 5:
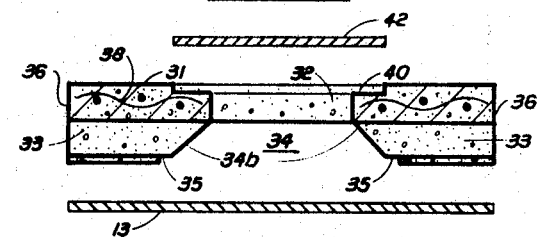
FIG. 5 is a vertical cross-sectional view of the junction block taken on the line 5-5 of FIG. 4.
Figure 3:
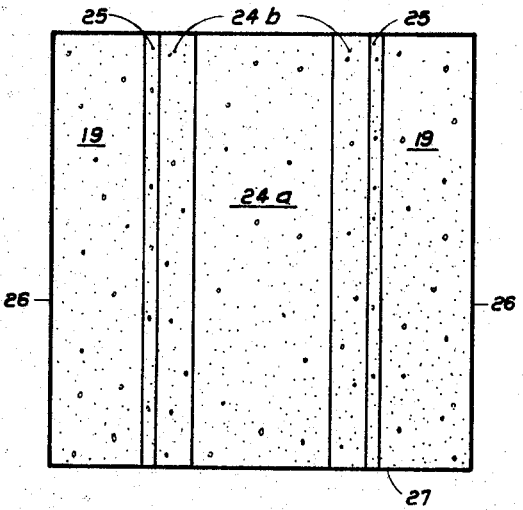
FIG. 3 is an underneath view of the channel block.

The junction block 30 is also provided with a circular center access opening 32, the diameter of which is preferably about 3½ inches to 4 inches. Access opening 32 is used for pulling the cables through the under-floor ducts, or for making electrical connections within the junction block 30. A circular indentation or recess 40 is provided in the top surface 31, around the peripheral edge of access opening 32, and is adapted to receive a metal cover plate 42. The cover plate 42 is shown in an open or raised position in drawing FIG. 5.

Figure 6:
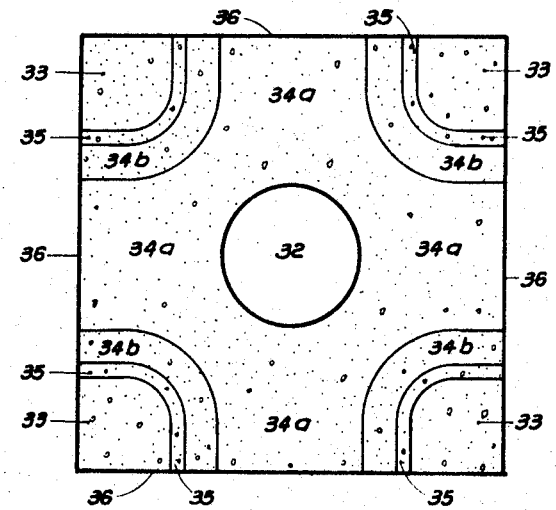
FIG. 6 is an underneath view of the junction block.

While the configuration of bottom plate 13 is not specifically shown, in any plan view, it will be readily evident from FIG. 6, which clearly shows the configuration of the four ledges or recesses 35 which receive the edges of the bottom plate 13.

Figure 7:
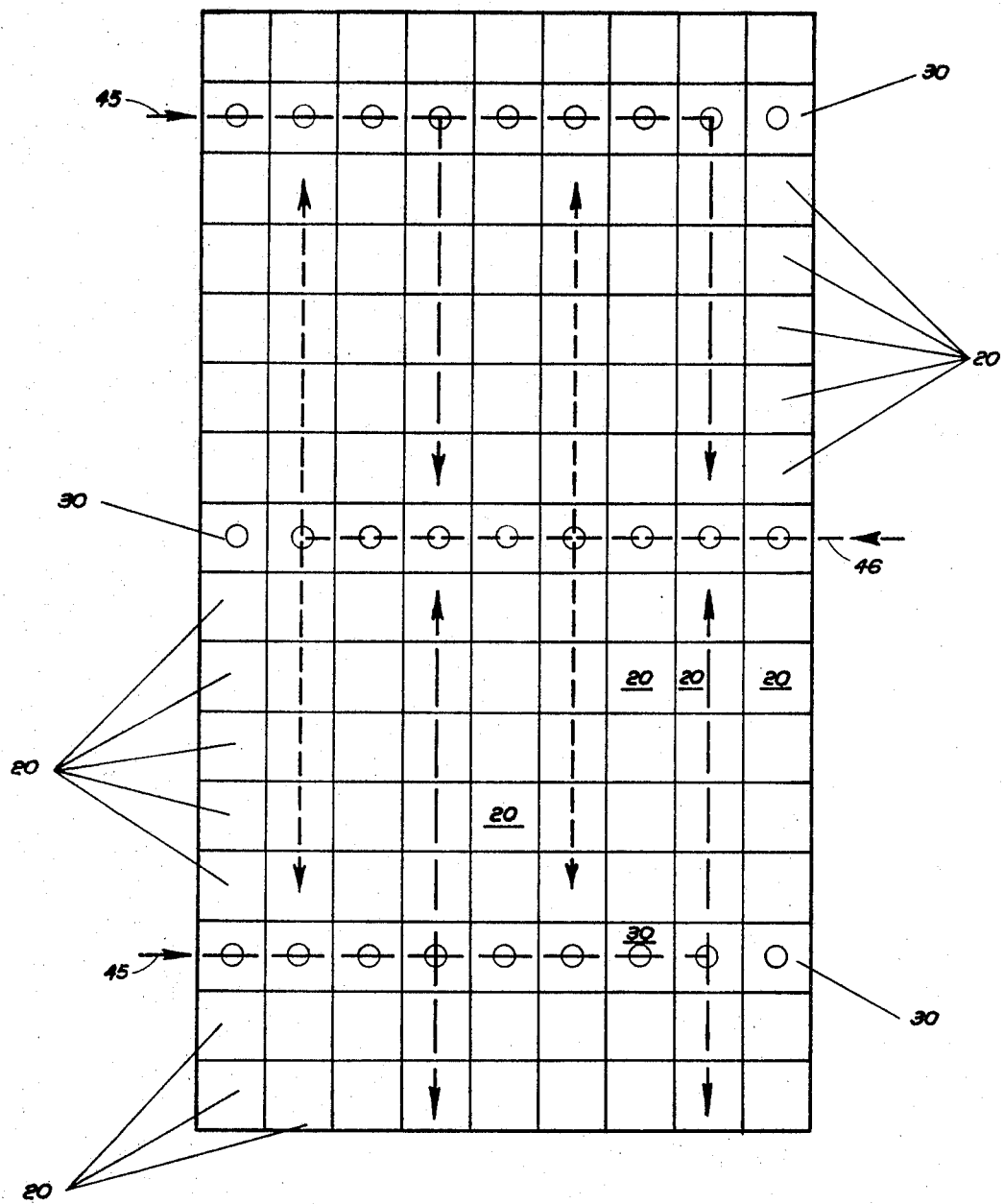
FIG. 7 is a top plan view of a completed floor surface showing, in dotted lines, the location of electrical cables beneath the surface.

FIG. 7 shows in schematic form a typical floor arrangement incorporating my invention. In FIG. 7 one type of dotted line is used to illustrate telephone cables 45 while another type of dotted line is illustrative of power cables 46. Three rows of junction blocks 30 are provided, which, as shown in FIG. 7, may be referred to as the upper, middle, and lower rows of junction blocks. Between each two adjacent rows of junction blocks there are five rows of channel blocks. However, as shown by the dotted lines indicating the locations of cables 45 and 46, the lengthwise (channel) direction of the channel blocks 20 is arranged perpendicular to the lengthwise directions of the rows of junction blocks. A telephone cable 45 enters the upper row of junction blocks and traverses all or most of the way across it. A telephone cable 45 also enters the bottom row of junction blocks and traverses most of the way across it. A power cable 46 traverses all or most of the way across the center rows of junction blocks. Lateral runs, interconnected within the junction blocks, extend out from each of the main runs of both telephone cable and power cable. Insofar as the present invention is concerned it would be possible to locate both power cables and telephone cables within the same channels, however, for electrical reasons that is not considered acceptable. Hence the significance of the arrangement as shown in FIG. 7 is that all areas of the floor surface can be reached both by telephone cables 45 and by power cables 46, but without any crossovers between the two types of cables, and without the two types of cables occupying the same channel at any point. It will be understood that if every available channel were used, power cable would be supplied in one channel or one row of blocks, and telephone cable in the next. This would mean that a power cable would be available every 2 feet under the floor surface, and a telephone cable would be available every 2 feet under the floor surface. Such an arrangement meets all maximum requirements for availability of electrical duct in accordance with present day construction practices.

As shown in FIG. 8 a floor fitting 50 may be located almost any place desired on the floor, and then a suitable interconnection made to the adjacent under-floor cable channel. An access hole 51 of approximately ½-inch diameter is cut from the surface of the block to the channel under the block, i.e., through the thin or base portion of the block. The floor fitting 50, in accordance with conventional practice, is typically located above the floor surface so that water and dirt will not enter into it. A depending portion of the floor fitting 50 extends into the access hole 51 for purpose of attachment, and also receives the cable such as 46 which then extends up from the under-floor channel to the floor fitting to be electrically connected to the interior of the fitting. In FIG. 8 the channel 24 is shown as containing two power cables 46 and a third power cable 47, the cable 47 being distinguished only by having somewhat larger diameter than the cables 46. One of the cables 46 passes up through the access hole 51 and is then terminated at the floor fitting 50.

It will be understood that, despite the existence of the central access opening 32 in each of the junction blocks 30, the junction blocks may also be used as a place for connection of a floor fitting to the underlying cable. The ½-inch access hole 51 is simply cut above one of the arms or branches of the channel 34.

In the present drawings the only junction block 30 that is illustrated has a central access opening 32 formed therein. However, it is desired to keep the number of cover plates 42 to a minimum, and for that reason it may be preferred to provide some of the junction blocks without an access opening. The reinforcing mesh 38 is then strengthened at the central portion of the block in order to provide adequate structural strength. If an access opening in a particular junction block is found to be required, after the block has already been installed in the floor, then it is a relatively simple matter to cut the access opening while the block is in place. This is done by means of a conventional type of circular saw.

At the present time I prefer to use cast reinforced concrete blocks for carrying out the purposes of my invention. However, for some applications it may be acceptable to use cast aluminum blocks, and for other applications it may be acceptable to use cast plastic blocks. In such other applications the preferred dimensions and configurations of the blocks may differ somewhat from those presently described.

I claim:

1. In a building, a floor structure adapted for providing connections to electrical cables at a variety of locations, comprising in combination:

a subfloor region having an uninterrupted flat surface area;

at least one electrical cable;

a plurality of flat rectangular blocks having a vertical thickness significantly greater than the diameter of said cable;

said blocks being aligned on and secured to said subfloor surface in parallel rows and in abutting relationship so that the upper surface of said blocks provide a floor surface, each block of at least a portion of at least one row having a single channel in its bottom surface for forming when in said row a single aligned channel, the vertical height of said channel being at least equal to the thickness of said cable;

each block of at least one other row essentially perpendicular to said one row having a cross-shaped channel in its bottom surface, the vertical height of said cross-shaped channel being at least equal to the thickness of said cable;

the cross-shaped channel of each of said blocks in said other row forming when in said other row a second aligned channel intersecting said first mentioned aligned channel;

said cable being positioned between said subfloor and said blocks within at least a portion of said first mentioned and said second aligned channels;

each of said blocks having a cross-shaped channel also having an opening communicating said upper surface and said cross-shaped channel;

said blocks are constructed of a generally homogeneous material with each block additionally including a metallic wire reinforcing mesh which lays about halfway between the top of the channel of said block and the upper surface of said block and is disposed parallel to said upper surface;

each of said blocks having a channel also has a recess in its under surface along each channel; and a sheet metal plate received by said recesses and enclosing the bottom of said channel whereby said cable rests upon said plate.

2. A structure as claimed in claim 1 including:

portions of a plurality of rows having single aligned channels formed in the bottom surface of the blocks of said rows;

a plurality of spaced-apart other rows, essentially perpendicular to said plurality of first mentioned rows, having cross-shaped channels formed in the bottom surface of the blocks of said other rows; and a plurality of cable segments being positioned within the plurality of single aligned channels, said cable segments being selectively connected to other cables positioned within the plurality of channels formed by said blocks having cross-shaped channels.

3. A structural member for providing a floor surface and for providing cable ducts comprising:

a flat rectangular block having length and width dimensions of approximately 1 foot and a thickness of about 2½ inches;

the upper surface of said block being flat and relatively smooth and the bottom surface of said block having a channel formed therein which extends lengthwise of the block;

the width of said channel being about ½ the width of said block and the depth of said channel being about ½ the thickness of said block;

the legs defined by said channel having vertical walls at their outer edges which constitute the side edges of said block;

the legs having sloping inner walls such that said channel is widest adjacent the bottom surface of said block;

said block having recesses in its bottom surface at each edge of said channel adapted to receive a sheet metal plate enclosing said channel without protruding beneath said block; and said block being formed of concrete and having a metal reinforcing mesh therein beneath the upper surface of said block.

4. A structural member for providing a floor surface and for providing cable ducts comprising:

a flat rectangular block having length and width dimensions approximately 1 foot and a thickness about 2½ inches;

the upper surface of said block being flat and relatively smooth and the bottom surface of said block having a cross-shaped channel therein which extends both the length and width of said block;

the depth of said channel being about ½ the thickness of said block;

the width of each of the four arms of said channel being about half the corresponding dimension of the block;

the four legs of the block thus formed having vertical outer walls but having their inner surfaces sloping so that all parts of said channel are widest adjacent the bottom surface of said block;

said block also having in the bottom surface of each of said legs a recess which adjoins the channel edges to receive a generally cross-shaped sheet metal plate enclosing said channel without protruding beneath said block; and said block being formed of concrete and having a metal reinforcing mesh therein beneath the upper surface of said block.